UNITED STATES PATENT OFFICE.

CHARLES E. POPE, OF PITTSBURG, PENNSYLVANIA.

BRICK OR LINING COMPOSITION FOR USE AT HIGH TEMPERATURES AND PROCESS OF MAKING THE SAME.

No. 895,787.     Specification of Letters Patent.     Patented Aug. 11, 1908.

Application filed February 21, 1908. Serial No. 416,956.

*To all whom it may concern:*

Be it known that I, CHARLES E. POPE, a citizen of the United States, and a resident of Pittsburg, in the county of Allegheny and State of Pennsylvania, (post-office address 421 Wood street, Pittsburg, Pennsylvania,) have invented certain new and useful Improvements in Brick or Lining Composition for Use at High Temperatures and the Process of Making the Same, of which the following is a specification.

The invention relates particularly to refractory bricks and linings composed largely of silica, for open-hearth furnaces, crucible steel furnaces, coke ovens, glass furnaces, and other high temperature uses, and its object is to produce such material of a highly desirable and refractory character mainly composed of finely divided burnt silica brick material containing not less than seventy per cent. of silica molded and bonded together without burning.

The invention also, among other results, makes it possible to utilize refuse silica brickbats and broken and discarded silica brick in the manufacture of the new brick or lining.

It is also available for the construction of monolithic structures and of blocks and shapes which are difficult or impossible to make of the usual burnt silica brick material.

It also enables me to make blocks and shapes of accurate size without the uncertainty due to the expansion in the original firing of the silica brick. It will be understood that by "brick" I mean to include, as equivalent, furnace linings, monolithic masses, and the like, whether built up or molded *in situ*.

The preferred process is as follows:— Where available I take broken or refuse silica fire brick and grind it. For the highest grade of material I prefer to select a silica brick composition containing about ninety-eight per cent. silica, as is common, though seventy per cent. and upwards is very serviceable. When I speak of the percentage of silica I do not mean to imply that it is all free or uncombined chemically. This ground material is then mixed with Portland cement and sufficient water to cause the cement to finally set when molded into bricks or other forms, or applied in place for linings, repairs, etc., as desired, and upon becoming hard it produces a new composition in which the finely divided silica brick material is embedded and bonded together by the hydrated Portland cement. Only enough cement need be used to fully embed and bond the ground brick, but I increase the amount where the brick, after being made, is to receive much handling or be transported. One part of cement to ten of the ground brick will make a good proportion.

Where refuse silica brick is not available it may be made, burned, and ground expressly, but the utilization of the waste brick will, of course, be a very great saving in cost.

I prefer, where it is especially desired to lessen the expansion of the composition under heat, to incorporate granular carbonaceous or other pore-forming material in the mixture, or in the Portland cement before mixture, or both, so that when in use at high temperatures pores will exist or be formed within the composition.

It will be seen by my process and in my finished composition or brick, that the major part of the composition consists of the silica brick material that has been burned at a high temperature in its formation, and is therefore peculiarly fitted to withstand such temperatures.

What I claim is:

1. The process of making a refractory composition, which consists in forming and burning a composition suitable for silica firebrick and containing from seventy to ninety-nine per cent. silica, subsequently finely dividing the same and mixing it with Portland cement and water, and causing the mass to set for substantially the purposes set forth.

2. The process of making a refractory composition, which consists in mixing finely divided and previously burnt silica brick, containing not less than seventy per cent. of silica with Portland cement and water, and then molding and allowing the mass to solidify.

3. A brick or lining composition for use at high temperatures, composed of finely divided burnt silica brick material containing at least seventy per cent. silica embedded in and bonded by Portland cement.

4. A brick or lining composition for use at high temperatures, composed of finely divided burnt silica brick material containing at least seventy per cent. silica embedded in and bonded by Portland cement, and containing pores.

In testimony whereof I have signed this specification in the presence of two subscribing witnesses, the 19th day of February 1908.

CHARLES E. POPE.

Witnesses:
  A. E. D. AMY,
  JAMES S. DOUTHITT.